United States Patent
Yamada

(10) Patent No.: US 8,865,371 B2
(45) Date of Patent: Oct. 21, 2014

(54) MEMBRANE ELECTRODE ASSEMBLY FOR POLYMER ELECTROLYTE FUEL CELL AND POLYMER ELECTROLYTE FUEL CELL

(75) Inventor: Kazuhiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/446,962

(22) PCT Filed: Oct. 24, 2007

(86) PCT No.: PCT/JP2007/071163
§ 371 (c)(1),
(2), (4) Date: Apr. 23, 2009

(87) PCT Pub. No.: WO2008/053905
PCT Pub. Date: May 8, 2008

(65) Prior Publication Data
US 2010/0015490 A1    Jan. 21, 2010

(30) Foreign Application Priority Data
Nov. 2, 2006    (JP) ................................. 2006-299470

(51) Int. Cl.
*H01M 2/14* (2006.01)
*H01M 8/04* (2006.01)
*H01M 8/10* (2006.01)

(52) U.S. Cl.
CPC ........ *H01M 8/1004* (2013.01); *H01M 8/04156* (2013.01); *H01M 2250/30* (2013.01); *Y02B 90/18* (2013.01); *Y02E 60/521* (2013.01); *H01M 8/04119* (2013.01)
USPC .......................................... 429/516; 429/483

(58) Field of Classification Search
CPC ............................. H01M 8/1004; H01M 4/02
USPC ................... 429/483, 516, 492, 514; 427/115
See application file for complete search history.

(56) References Cited

U.S. PATENT DOCUMENTS

| | | | |
|---|---|---|---|
| 5,958,616 A | | 9/1999 | Salinas et al. |
| 6,485,855 B1 * | | 11/2002 | Fukuda et al. ................ 429/492 |
| 2003/0044672 A1 | | 3/2003 | Fukumoto et al. |
| 2005/0058870 A1 * | | 3/2005 | Healy et al. ..................... 429/30 |

FOREIGN PATENT DOCUMENTS

| | | |
|---|---|---|
| JP | 10-289723 | 10/1998 |
| JP | 2001-006702 A | 1/2001 |
| JP | 2001-085033 A | 3/2001 |
| JP | 2002-42823 | 2/2002 |
| JP | 2002-100372 | 4/2002 |
| JP | 2003-151585 | 5/2003 |
| JP | 2004-327358 | 11/2004 |
| JP | 2005-032681 A | 2/2005 |
| JP | 2005-38780 | 2/2005 |

(Continued)

*Primary Examiner* — Natalia Levkovich
(74) *Attorney, Agent, or Firm* — Canon U.S.A., Inc. IP Division

(57) ABSTRACT

The present invention provides a membrane electrode assembly for a polymer electrolyte fuel cell, including: an electrolyte membrane; a catalyst layer; and a conductive porous gas diffusion layer, in which an interface between the catalyst layer and the electrolyte membrane is provided with a groove for allowing one of passage and retention of a fluid, and a polymer electrolyte fuel cell employing the membrane electrode assembly. As a result, there is provided at low costs the membrane electrode assembly for a polymer electrolyte fuel cell having improved drainage performance and the polymer electrolyte fuel cell employing the membrane electrode assembly and having stable power generation performance.

6 Claims, 10 Drawing Sheets

(56) References Cited

FOREIGN PATENT DOCUMENTS

| JP | 2005-310545 | 11/2005 |
| JP | 2006-40767 | 2/2006 |
| JP | 2006-040767 A | 2/2006 |
| JP | 2007-141588 | 6/2007 |
| JP | 2007-141588 A | 6/2007 |

* cited by examiner

MEMBRANE ELECTRODE ASSEMBLY FOR POLYMER ELECTROLYTE FUEL CELL AND POLYMER ELECTROLYTE FUEL CELL

TECHNICAL FIELD

The present invention relates to a membrane electrode assembly for a polymer electrolyte fuel cell and a polymer electrolyte fuel cell using the same.

BACKGROUND ART

A polymer electrolyte fuel cell has a high energy conversion efficiency, is clean, and is quiet, so there is an expectation for a future energy generating apparatus. In recent years, there are applications to automobiles, domestic power generators, and the like. Further, owing to a high energy density and a low operation temperature of the polymer electrolyte fuel cell, when the polymer electrolyte fuel cell is mounted to small electrical equipment such as a mobile phone, a notebook computer, and a digital camera, the small electrical equipment can be driven for a longer time than a case of using a conventional secondary battery. Accordingly, the polymer electrolyte fuel cell receives attention.

However, while the polymer electrolyte fuel cell can be driven at operating temperature of 100° C. or less, there is a problem in that with passage of power generation time, a voltage gradually decreases and power generation stops at last. This is due to so-called "flooding", in which water generated by reaction is retained in a space serving as an air hole for a fuel gas, thereby inhibiting supply of the fuel gas which is a reactant and thus stopping power generation reaction. In particular, the flooding tends to occur in a catalyst layer on a cathode side, in which water generates.

Further, in order to put the fuel cell into practical use for the small electrical equipment, downsizing of a system as a whole is essential. In particular, in a case of mounting the fuel cell to the small electrical equipment, the fuel cell itself also has to be downsized, so, in many cases, there is adopted a method of supplying air from the air hole to an air electrode by natural diffusion without using a pump, a blower, or the like (air breathing method). In this case, a product water can be discharged to an outside of the fuel cell only by natural evaporation, so the product water tends to be retained in the catalyst layer thereby causing the flooding.

In general, a separator provided to a gas supply and exhaust portion of the fuel cell is provided with a fluid passing groove for preventing the flooding. The fluid passing groove is used as a gas diffusion path and a drainage path for the product water. Further, in order to smoothly perform drainage of the water, a groove surface of the separator is applied when necessary with a water repellent such as polytetrafluoroethylene (PTFE) or a separator material, a groove machining method, a groove shape, or the like is devised. Further, of the fuel cells using the air breathing method, there is one which is devised by using foamed metal or the like in place of the separator so that a space ratio of the gas supply and exhaust portion is increased to 90% or more to promote the natural diffusion of the product water or to utilize the space as the drainage path for the product water.

However, when the fuel cell is driven at high current density for a long time, voltage drop of the fuel cell is caused. This is because the water vapor generated by the power generation is condensed in holes of a gas diffusion electrode formed of a gas diffusion layer (hereinafter, also referred to as GDL) and the catalyst layer, thereby causing the flooding in the gas diffusion electrode.

Further, in a fuel cell of a type in which a membrane electrode assembly (hereinafter, also referred to as MEA) is sandwiched by separators having gas passing grooves and in a fuel cell of a stack type, depending on a position in an electrode surface, a diffusion distance of a reaction gas and water vapor from an outside of a cell unit differs. Therefore, in a plane of the gas diffusion electrode, partial pressure of water vapor distribution is caused. In this case, when the fuel cell is driven at high load for a long time, a difference in the partial pressure of water vapor distribution increases, thereby locally approaching a saturated vapor pressure. As a result, a product water vapor is locally condensed in the holes in the gas diffusion electrode to occupy the holes, thereby causing the local flooding.

In order to prevent the flooding in the gas diffusion electrode as described above, the drainage performance of the gas diffusion electrode needs to be improved.

For this purpose, in general, the inside of the holes of the GDL and the catalyst layer are often imparted water repellency by a water repellent or the like such as PTFE.

As a specific material of the GDL, there is used a carbon cloth, carbon paper, or the like including a mixture of carbon fibers each having a diameter of several micrometers and a hydrophobic resin such as PTFE.

Alternatively, a carbon cloth or carbon paper used as a base substrate and having one surface or both surfaces coated with a microporous layer or microporous layers including a mixture of carbon fine particles and the hydrophobic resin is also used as the GDL. This is because the microporous layer enables to reduce a contact resistance between the catalyst layer or a current collector and the GDL. In this specification, a term "GDL" includes a conductive porous body including the microporous layer and the base substrate.

In order to impart the water repellency to the catalyst layer, there is generally adopted a method of mixing fine particles including hydrophobic polymer such as PTFE with catalyst fine particles, carbon-carrying fine particles, or the like. Note that PTFE fine particles are non-conductors and have no catalytic activity. Accordingly, when a large amount the PTFE fine particles is added in order to improve hydrophobic property of the catalyst layer, the catalytic activity and a catalyst utilization rate are reduced.

As described above, while the GDL and the catalyst layer each have the water repellency, in many cases, the water repellencies of those are adjusted such that the water repellency of the catalyst layer is higher than that of the GDL. The adjustment is preformed in this manner in order to move condensed water from the catalyst layer to the GDL and to prevent backflow of the water from the GDL to the catalyst layer.

However, in the porous body imparted the hydrophobic property, water receives a force to be pushed to the outside from the porous body. Therefore, impregnation of the hydrophobic porous body with water involves a large resistance in theory, so an infiltration rate of the water into the GDL is low.

Therefore, when the fuel cell is driven at high load, a generation amount of the product water generated by being condensed in the catalyst layer exceeds an amount corresponding to the infiltration rate into the GDL. Accordingly, the condensed water is caused to be retained in an interface between the GDL and the catalyst layer.

In contrast, there are cases where the product water is condensed in the GDL. In this case, the product water is pushed out to the surface of the GDL, but a part of the condensed water is caused to deposit on the interface between the GDL and the catalyst layer. Both the catalyst layer and the GDL are hydrophobic, so the water cannot easily infiltrate into the holes thereof. As a result, the condensed water retained in the interface is caused.

In a case where output density of the fuel cell is low, all the product water is diffused in a form of water vapor, so the above-mentioned problem does not occur. However, when the fuel cell is driven at high current density for a long time, as described above, due to a difference in diffusion rate distribution of water vapor, the number of portions increases, where the partial pressure of water vapor locally rises so as to approach the saturated vapor pressure in the gas diffusion electrode. Accordingly, an amount of the product water condensed in the GDL or the catalyst layer increases as a driving time passes. In this case, the condensed water retained in the interface between the GDL and the catalyst layer as described above increases.

When the product water is retained in the interface between the GDL and the catalyst layer, a water layer having a large area is formed even by a small amount of water. Accordingly, an area for supplying a reactant gas to the catalyst layer is largely reduced. As a result, a voltage of the fuel cell is reduced by a large amount or the power generation is stopped.

As described above, with a method of imparting the water repellency to the GDL and the catalyst layer, there is a problem in that, in the case where the fuel cell is driven at high load for a long time, the condensed water is retained in the interface between the GDL and the catalyst layer. Accordingly, it is hard to say that the water repellency of the gas diffusion electrode is effectively improved.

In order to solve the problem mentioned above, there is devised a method in which, in the GDL, fine particles of two types which differ from each other in hydrophobic property are bounded by being mixed with each other to separately provide drainage paths and reaction gas diffusion paths (Japanese Patent Application Laid-Open No. H10-289723).

Further, there are also devised a method in which drainage grooves are provided in a surface of the catalyst layer, which is brought into contact with the GDL (Japanese Patent Application Laid-Open No. 2004-327358 and Japanese Patent Application Laid-Open No. 2005-38780), a method in which the drainage grooves are provided in surfaces of the GDL on current collector sides (Japanese Patent Application Laid-Open No. 2002-100372), and a method in which the GDL is provided with hydrophobic through holes and hydrophilic through holes (Japanese Patent Application Laid-Open No. 2003-151585).

However, with the conventional methods mentioned above, the following problems occur.

First, in a case of a structure described in Japanese Patent Application Laid-Open No. H10-289723, there is the following problem. It is expected that the drainage paths and the reaction gas diffusion paths in the GDL be formed by chance. Accordingly, a structure of the each path is not controlled, so there may be a case where the drainage paths and the reaction gas diffusion paths are longer than necessary. Alternatively, in a position where the both paths are connected midway to each other, drain water stops midway therethrough, so there may be a case where the gas diffusion path is clogged.

In a case of a structure described in Japanese Patent Application Laid-Open No. 2004-327358 and Japanese Patent Application Laid-Open No. 2005-38780, in which concave grooves for drainage are provided in the surface of the catalyst layer, which is brought into contact with the gas diffusion layer, there is a problem in that a catalyst-carrying amount is reduced by an amount corresponding to a volume of the grooves, so a reaction area of the catalyst is reduced, thereby reducing an output density of the fuel cell.

Further, with the structure described in Japanese Patent Application Laid-Open No. 2004-327358 and Japanese Patent Application Laid-Open No. 2005-38780, there is a problem in that, when the grooves are filled with the drain water, an area for suction to the catalyst layer is reduced.

Further, in a case of a structure described in Japanese Patent Application Laid-Open No. 2002-100372, in which the drainage grooves are provided in the surfaces of the GDL on the current collector sides, there is a problem in that, when the grooves are filled with the drain water, the area for suction to the catalyst layer is reduced.

Japanese Patent Application Laid-Open No. 2003-151585 describes a structure in which the gas diffusion layer is provided with the through holes and the through holes are completely isolated from each other into gas diffusion paths and water diffusion paths. As described in Example 2, in a case where a non-porous material such as metal is used for a diffusion layer substrate, it is difficult for a fuel gas to reach the catalyst brought into contact with the substrate, thereby causing the reaction area of the catalyst to be reduced. As a result, the flooding can be suppressed, but there is a problem in that, due to reaction gas supply rate control, a limit current density is reduced.

Further, in this structure, the through holes are completely isolated into the gas diffusion paths and the water diffusion paths. Accordingly, in a case of the fuel cell using the air breathing method in which a porous conductor made of foamed metal or the like is used in place of the separator, there is a problem in that a flooding suppression effect by the above-mentioned structure is obtained only in a restrictive manner.

A reason for this is that the conductive porous body has a porous structure in which all holes thereof are usually continuous with each other, so inside of the holes can be controlled only to be hydrophobic or hydrophilic, and although the gas diffusion through holes and the water diffusion through holes are isolated in the gas diffusion layer to any high degree, the both paths cross each other in the conductive porous body.

The related art technology involves the above-mentioned problems, and there has been a demand for effectively improving drainage performance of the gas diffusion electrode.

DISCLOSURE OF THE INVENTION

The present invention has been made in view of the above-mentioned problems, and the present invention provides a MEA for a polymer electrolyte fuel cell, having a structure in which a groove for allowing passage or retention of a fluid is provided in an interface between a catalyst layer and an electrolyte membrane, thereby improving drainage performance.

Further, the present invention provides a polymer electrolyte fuel cell having a stable power generation performance by using the MEA mentioned above at low costs.

A membrane electrode assembly for a polymer electrolyte fuel cell which achieves the above-mentioned object includes: an electrolyte membrane; a catalyst layer; and a conductive porous gas diffusion layer, and in the membrane electrode assembly for a polymer electrolyte fuel cell, an interface between the catalyst layer and the electrolyte membrane is provided with a groove for allowing one of passage and retention of a fluid.

It is desirable that the groove for allowing one of passage and retention of the fluid be provided to a surface of the catalyst layer on a side of the electrolyte membrane.

It is desirable that the groove for allowing one of passage and retention of the fluid include a dent formed by providing a recessed portion in a surface of the conductive porous gas diffusion layer on a side of the electrolyte membrane and providing the catalyst layer on a surface of the recessed portion.

It is desirable that the groove for allowing one of passage and retention of the fluid have a width of 3 μm or more to 1000 μm or less.

It is desirable that the groove for allowing one of passage and retention of the fluid have a width decreasing from a central portion of the catalyst layer to an outer peripheral portion thereof.

It is desirable that the groove for allowing one of passage and retention of the fluid be provided to a cathode side of the membrane electrode assembly.

A polymer electrolyte fuel cell which achieves the above-mentioned object includes the membrane electrode assembly for the polymer electrolyte fuel cell described above.

According to the present invention, the groove, provided to the interface between the catalyst layer and the electrolyte membrane, for allowing passage or retention of the fluid functions as a fluid passing groove or a fluid retention portion.

The present invention provides at low costs a polymer electrolyte fuel cell having a stable power generation performance by using the gas diffusion electrode having improved drainage performance.

According to the present invention, flooding in which water is retained in the interface between the GDL and the catalyst layer to inhibit supply of a reactant gas can be reduced. Accordingly, the fuel cell can be stably driven at high load for a long time.

Further features of the present invention will become apparent from the following description of exemplary embodiments (with reference to the attached drawings).

BEST MODE FOR CARRYING OUT THE INVENTION

Hereinafter, with reference to the drawings, detailed descriptions will be made of a grooved membrane electrode assembly (hereinafter referred to as "grooved MEA") for a polymer electrolyte fuel cell according to a present invention by using preferred embodiments as examples. Note that unless there is a specific description, materials, dimensions, shapes, relative arrangements, and the like of components described in this embodiment are not provided with an intention of limiting a scope of the present invention only to those. Similarly, a manufacturing method described below is not exclusive.

Figure 1:
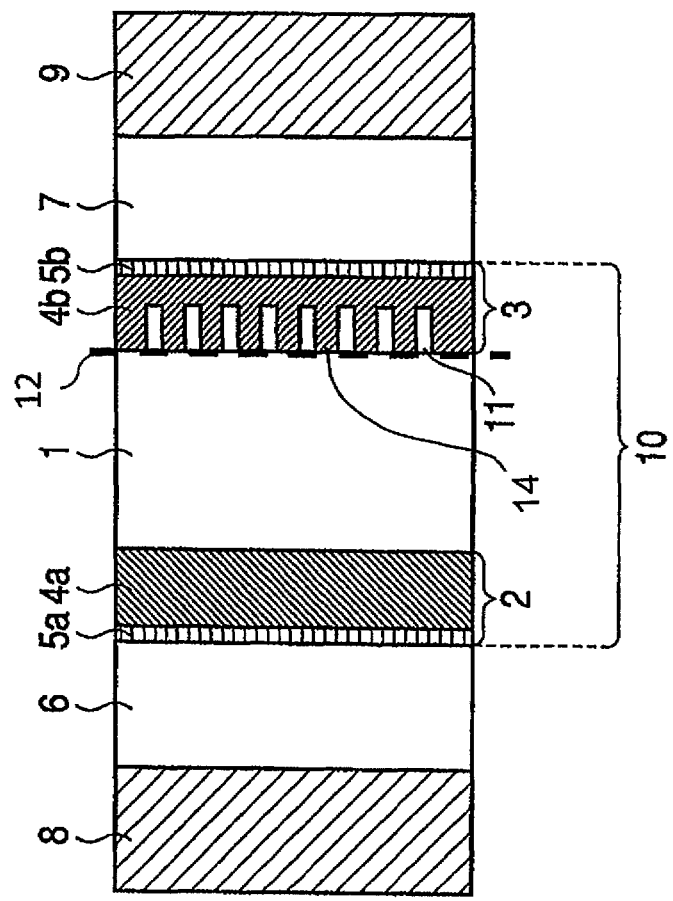
FIG. 1 is a schematic diagram illustrating an example of a sectional structure of a single cell of a polymer electrolyte fuel cell manufactured by using a grooved MEA according to the present invention.

FIG. 1 is a schematic diagram illustrating an example of a sectional structure of a single cell of a polymer electrolyte fuel cell manufactured by using a grooved MEA according to the present invention. In FIG. 1, a polymer electrolyte membrane 1 is sandwiched between a pair of catalyst layers, that is, a catalyst layer 2 on an anode side and a catalyst layer 3 on a cathode side. A membrane electrode assembly is denoted by reference numeral 10.

In this embodiment, there is shown an example in which grooves are arranged only on the cathode (air electrode) side. However, an arrangement structure is not limited to this and includes a case where the grooves are arranged on both electrodes and also a case where the grooves are arranged only on the anode side. Therefore, the structure can be desirably selected from various structures.

The catalyst layers 2 and 3 include catalysts 4a and 4b and catalyst carriers 5a and 5b for supporting the catalysts 4a and 4b, respectively. In the catalyst 4b on the cathode side, there are provided grooves 11 for allowing passage therethrough or retention therein of a fluid.

On an outer side of the catalyst layer 2 on the anode side, there are arranged an anode-side gas diffusion layer 6 and an anode-side electrode (fuel electrode) 8. On an outer side of the catalyst layer 3 on the cathode side, there are arranged a cathode-side gas diffusion layer 7 and a cathode-side electrode (air electrode) 9.

The polymer electrolyte membrane 1 is formed of a polymer material such as a perfluorocarbon polymer containing a sulfonic acid group and a non-fluorinated polymer. For example, a sulfonic acid type perfluorocarbon polymer, a polysulfone resin, a phosphonic acid group, or a perfluorocarbon polymer containing a carboxylic acid group can desirably be used. As a perfluorosulfonic acid polymer, Nafion (manufactured by DuPont) is provided as an example. Further, examples of the non-fluorinated polymer include sulfonated structure polyether ketone and polysulfone.

Note that, in a case where protons $H^+$ move through the electrolyte membrane toward the cathode side, the protons $H^+$ move in a hydrophilic portion in the electrolyte membrane through medium of water molecules. Accordingly, the electrolyte membrane has to have a function of retaining the water molecules. Therefore, required functions of the polymer electrolyte membrane include transmission of the protons $H^+$ generated on the anode side to the cathode side, prevention of passage of an unreacted reactant gas (hydrogen and oxygen) therethrough, and a predetermined water retaining function. Any material which satisfies those conditions can be selected for use.

The catalyst layers 2 and 3 are porous layers each including an electronic conductor having a hydrogen reduction property or an oxygen oxidation property and a proton conductive electrolyte. For the catalyst layer, there may be selectively used any material as long as the material has a catalytic property (hydrogen reduction property or oxygen oxidation property), proton conductivity, electron conductivity, and gas diffusibility for a fuel cell reaction.

For the catalysts 4a and 4b, specifically, fine particles including platinum-group metal such as platinum, rhodium, ruthenium, iridium, palladium, or osmium, and an alloy of those. As the catalyst layer, specifically, there may be desirably used a porous layer machined in a layer shape after mixing catalyst fine particles with the proton conductive electrolyte or a porous layer machined in a layer shape after mixing the catalyst particles dispersed and carried on a carrier including carbon fine particles or the like with the proton conductive electrolyte. It is more desirable to mix a water repellent with the catalyst layer.

Functions of the catalyst carriers 5a and 5b include improving catalytic activity as promoters, retaining a shape of a hydrophobic catalyst, ensuring an electron conduction channel, increasing a specific surface area, and the like. For the catalyst carrier, carbon black or a gold-particle membrane layer may be desirably used. Note that the catalyst carriers 5a and 5b may not necessarily be used.

In order to allow the fuel cell reaction to be effectively performed, the gas diffusion layers 6 and 7 supply, to an electrode reaction region in the catalyst layer of the fuel electrode or the air electrode, a fuel gas or air, respectively, sufficiently and uniformly in a plane. At the same time, the gas diffusion layers 6 and 7 serve to release an electrical charge generated by an anode electrode reaction to an outside of the single cell, and to discharge a reaction product water or an unreacted gas to the outside of the single cell.

It suffices that the gas diffusion layer is made of a conductive porous material, and the gas diffusion layer desirably has hydrophobic property. Specifically, it is desirable that the gas diffusion layer be made of at least any one or more kinds of material selected from the group consisting of carbon fine particles, carbon fibers, foamed metal, a foamed alloy, and metal fibers and a hydrophobic resin. For example, a commercial carbon cloth or carbon paper may desirably be used.

It is desirable that, on a surface brought into contact with a catalyst layer of a GDL, there is formed a conductive microporous layer made of a mixture of the carbon fine particles and PTFE.

Figure 2A:
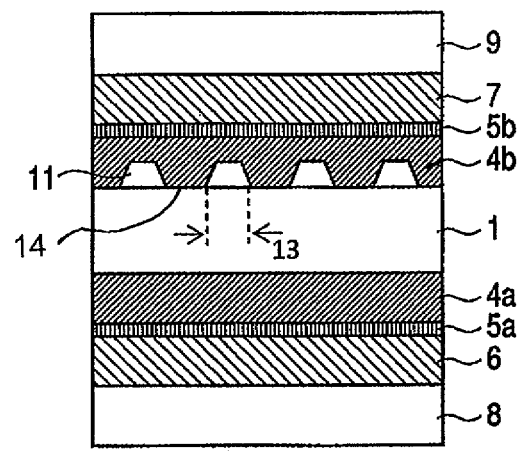
FIGS. 2A, 2B and 2C are each schematic diagrams illustrating a modification example of a sectional structure of a single cell of a polymer electrolyte fuel cell manufactured by using a grooved MEA according to the present invention.
Figure 2B:
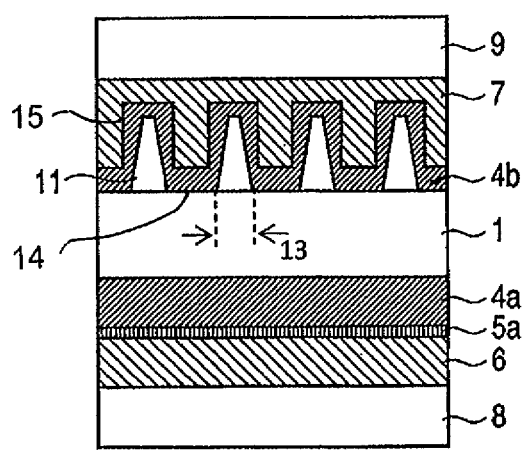
Figure 2C:
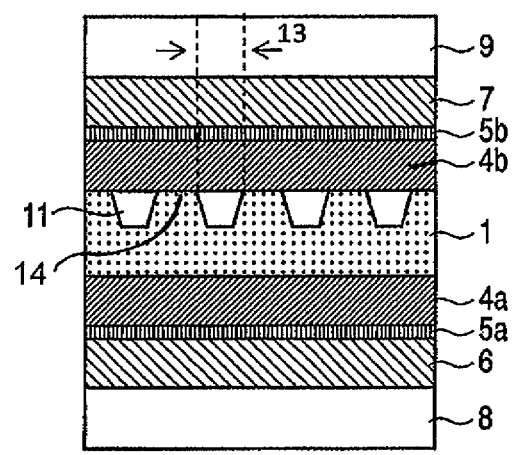

FIGS. 2A, 2B and 2C are each a schematic diagram illustrating a modification example of a sectional structure of a single cell of a polymer electrolyte fuel cell manufactured by using the grooved MEA according to the present invention.

A structure of the MEA according to the present invention is characterized in that, as illustrated in FIGS. 2A, 2B and 2C, the grooves 11, functioning as fluid passing grooves or fluid retention portions, in a surface on the electrolyte membrane side of the catalyst layer. Note that components as those of FIG. 1 are denoted by the same reference symbols as those of FIG. 1.

Further, it is desirable that, as illustrated in FIG. 2B, the grooves for allowing passage therethrough and retention therein of the fluid include dents formed by providing recessed portions 15 in a surface of the GDL on the electrolyte membrane side and providing the catalyst layer on surfaces of the grooves. As described above, there may be employed the structure in which the grooves are provided in the surface of the GDL on the electrolyte membrane side and the catalyst layer is provided along the surfaces of the grooves, thereby forming the grooves in an interface between the catalyst layer and the electrolyte membrane.

Further, as illustrated in FIG. 2C, the grooves may desirably be provided in a surface of the electrolyte membrane, which is brought into contact with the catalyst layer.

By making the MEA have the above-mentioned structure, the product water condensed in the catalyst layer is guided to the grooves provided to the interface between the electrolyte membrane and the catalyst layer preferentially than toward the GDL to be discharged. Accordingly, the product water is not retained in the interface between the catalyst layer and the GDL.

Further, with the MEA of the present invention, in a case where the grooves are filled with drain water, an area for sucking a fuel gas to the catalyst layer is not reduced, so power generation performance of the fuel cell is not degraded.

Further, water which is being drained from the grooves exerts an effect of moistening the electrolyte in a place where the electrolyte membrane is dried to uniform a moisture content distribution in the surface of the MEA. Accordingly, with the MEA of the present invention, the fuel cell can stably be driven for a long time.

At least an end of the each groove is desirably opened to an outside of the above-mentioned surface. With this structure, water retained in the grooves is more easily discharged from the MEA. Further, in a case other than a high-output operation in which water discharge constitutes a problem, the grooves are not filled with water, so the grooves may be utilized as diffusion paths for the reaction gas or water vapor.

A width 13 of the each groove is desirably 3 μm or more to 1000 μm or less, and is more desirably 10 μm or more to 100 μm or less. When the width is less than 3 μm, the groove is too narrow and a viscous force of the condensed water in the groove increases, so water can no longer be discharged easily from the end portion of the groove, thereby degrading drainage performance. On the other hand, when the width is larger than 1000 μm, the groove is too wide, so there is a fear of the grooves being deformed to be crushed at a time of assembling a fuel cell unit.

Further, a depth of the each groove provided to the gas diffusion layer is desirably 3 μm or more and is more desirably 5 μm or more. When the depth of the groove is less than 3 μm, the depth is small, so the adhesion force of the condensed water in the grooves increases, thereby increasing a moving resistance of the water and reducing a drainage performance. There is no strict limit for an upper limit of the groove depth, but it is desirable that the groove depth be about a half a thickness of the gas diffusion layer. When the groove depth is too large compared to the thickness of the gas diffusion layer, a mechanical strength of the gas diffusion layer itself decreases and the gas diffusion layer is more easily broken at the time of assembling the fuel cell unit, thereby being not desirable.

Further, also in a case where the grooves are provided to the catalyst layer, the groove depth is desirably 3 μm or more and is more desirably 5 μm or more.

Further, in a surface of the gas diffusion layer, which is brought into contact with the catalyst layer, there are provided one or plural grooves. However, it is desirable that the plural grooves be provided. Each of intervals between the grooves in a case where the plural grooves are provided is desirably 5 μm or more to 1000 μm or less, and is more desirably 10 μm or more to 100 μm or less. When the each interval is less than 5 μm, the groove interval is too small, so each ridge portion 14 between the grooves tend to be removed. Further, when the each interval is more than 1000 μm, the groove interval is too large, so a distance until the condensed water generated between the grooves arrives the groove portion becomes too long, thereby causing degradation in drainage performance. Note that the groove interval refers to an average length from an end portion of one of the grooves to an end portion of the groove adjacent to the one of the grooves.

It is desirable that the width of the grooves decrease from a portion where a partial pressure of water vapor is high to a portion where the partial pressure of water vapor is low. In the portion where the partial pressure of water vapor is high, a water vapor easily aggregates. In this regard, by forming the grooves to have the above-mentioned groove width, owing to a capillary force or a Knudsen effect, the condensed water can be introduced or dispersed to a portion where the partial pressure of water vapor is low.

Further, it is desirable that the surface of the gas diffusion layer, which is brought into contact with the catalyst layer, be made of a conductive porous material including at least any one or more kinds of material selected from the group consisting of carbon fine particles, carbon fibers, foamed metal, a foamed alloy, and metal fibers.

Further, a gas diffusion electrode is desirably a cathode. In the polymer electrolyte fuel cell, the product water is generated in the catalyst layer on the cathode side, so flooding tends to occur in the cathode, so the MEA of the present invention is greatly effective.

While there are various methods of manufacturing a fuel cell single cell using the grooved MEA of the present invention, taking a case of the structure illustrated in FIG. 1 as an example, a description will be made below with an example of the various methods. Note that the present invention is not limited to the following manufacturing method.

Step of Providing Grooves in a Cathode-Side GDL

A carbon cloth (LT1200-W manufactured by E-TEK) serving as a GDL is used, and a carbon-particle-layer side thereof is machined to have a desired grooved configuration by a laser. A kind of the laser, an output of the laser, a beam size, a pulse width, a scanning speed, and the like thereof are adjusted such that the desired grooved configuration is obtained.

(2) Step of Preparing Cathode-Side Catalyst Layer

On the grooved GDL obtained in Step (1), a porous platinum oxide catalyst layer is formed by a reactive sputtering process. Successively, by performing a hydrogen reduction processing with respect to the platinum oxide catalyst layer, a porous platinum catalyst layer is obtained.

A thickness of the catalyst layer is desirably about ⅓ or lower of a maximum width of the each groove provided to the GDL in Step (1). When the catalyst layer is formed to have a too large thickness, the grooves are filled with the catalyst and a space for drainage becomes small, thereby reducing the drainage performance.

After that, an appropriate amount of a Nafion solution (5 wt %, manufactured by Wako Pure Chemical Industries, Ltd.) is dropped, and the Nafion solution is volatilized in vacuum thereafter, thereby forming an electrolyte channel on a surface of the catalyst.

Other than a catalyst layer forming method using the reactive sputtering process, a spraying method may be used to form a platinum-carrying carbon catalyst layer or a platinum black catalyst layer on the GDL.

Specifically, there is used a slurry obtained by mixing platinum-carrying carbon (HiSPEC4000 manufactured by Johnson Matthey) or platinum black (HiSPEC1000 manufactured by Johnson Matthey) with Nafion, PTFE, isopropyl alcohol (IPA), and water are used to form the catalyst layer by a method such as a spray coating method on the grooved GDL obtained in Step (1).

(3) Step of Preparing an Anode-Side Catalyst Layer

On a PTFE sheet, the platinum-carrying carbon catalyst layer or the platinum black catalyst layer is formed by using a doctor blade. A thickness of the catalyst layer is desirably in a range of 20 μm or more to 40 μm or less. A catalyst slurry used in this case is a mixture of the platinum-carrying carbon (HiSPEC4000 manufactured by Johnson Matthey) or the platinum black (HiSPEC1000 manufactured by Johnson Matthey) and Nafion, PTFE, isopropyl alcohol (IPA) and water.

(4) Step of Manufacturing a MEA

By the cathode-side and anode-side cathode catalyst layers obtained in Steps (2) and (3), respectively, a polymer electrolyte membrane (Nafion112 manufactured by DuPont) is sandwiched therebetween to perform hot press. Further, after the PTFE sheet on the anode-side catalyst layer is removed, the pair of catalyst layers are transferred to the polymer electrolyte membrane, and the polymer electrolyte membrane and the pair of catalyst layers are selected to each other. As a result, the grooved MEA of the present invention is obtained.

(5) Step of Manufacturing a Single Cell

The MEA prepared in Step (4) and the anode-side GDL (LT1200-W), an electrode of the fuel electrode, and an electrode of the air electrode are allowed to overlap with each other as illustrated in FIG. 1, thereby manufacturing the fuel cell single cell.

The present invention is not limited to the polymer electrolyte fuel cell having a single cell structure but can be applied to the polymer electrolyte fuel cell having a structure in which plural single cells are stacked on each other.

Next, the present invention will be described in detail by specific examples.

EXAMPLE 1

In this example, there is manufactured a polymer electrolyte fuel cell having the structure illustrated in FIG. 1 of the embodiment.

Hereinafter, manufacturing steps of the polymer electrolyte fuel cell according to this example will be described in detail.

(Step 1)

A surface of a carbon fine particle layer of a carbon cloth (LT1200-W manufactured by E-TEK), was irradiated with YAG laser to machine the surface to have the grooved configuration. An output of the laser was 8 W, a beam size thereof was 10 μm, a pulse width thereof was 3 μm/pulse, and a scanning speed thereof was 15 mm/sec. In order to form the groove having a width of 15 μm, the laser was applied twice for each of the grooves. A second application was performed after shifting an application position by 8 μm in a groove width direction from that of the first application.

The above-mentioned operations were repeatedly performed to obtain a GDL having a structure in which grooves each having a width of 15 μm were arranged on entire surface of the carbon fine particle layer at intervals of 20 μm. After that, a gas diffusion layer was cut out correspondingly to an electrode dimension so that all groove end portions were opened on side surfaces of the gas diffusion layer.

Figure 3:
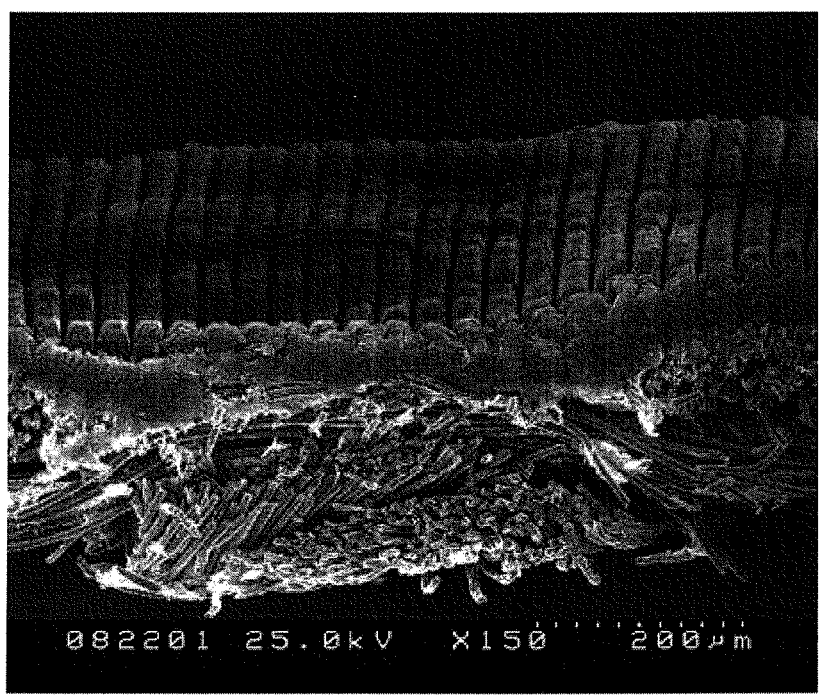
FIG. 3 is a scanning electron micrograph (magnification of 150 times) illustrating a sectional structure of a grooved GDL according to Example 1 of the present invention.
Figure 4:
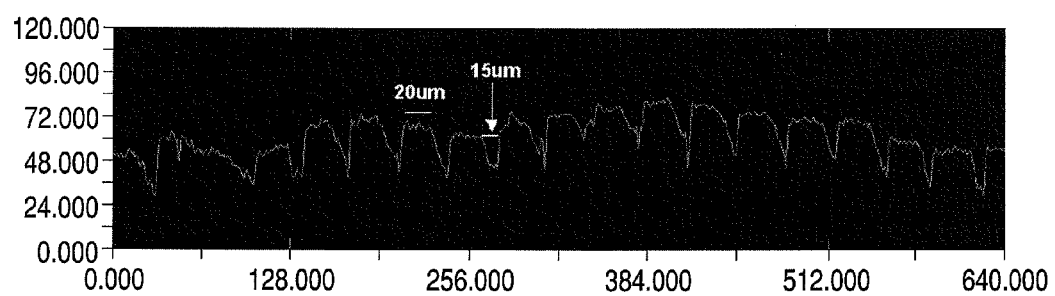
FIG. 4 is a laser micrograph illustrating the sectional structure of the grooved GDL according to Example 1 of the present invention.

FIGS. 3 and 4 illustrates figures illustrating a shape of the grooves formed in the GDL by laser machining. FIG. 3 is a scanning electron micrograph (magnification of 150 times) illustrating a sectional structure of the grooved GDL according to Example 1 of the present invention. FIG. 4 is a laser micrograph (unit: μm) illustrating the sectional structure of the grooved GDL according to Example 1 of the present invention.

In FIG. 3, a lower layer is a carbon cloth layer formed of carbon fibers and an upper layer is a microporous layer formed of carbon fine particles. It is understood that the plural grooves are formed in the microporous layer.

Further, with reference to FIG. 4, shapes and dimensions of the grooves are understood. That is, it is understood that the each groove has a V shape having a width of about 15 μm and a depth of about 30 μm to 40 μm, and the grooves are formed at intervals of about 20 μm. There is variation in the groove depth because a certain level of swelling is caused in the carbon cloth and a focal point of a laser beam cannot be made always consistent on a surface of the carbon fine particle layer.

(Step 2)

In order to manufacture the cathode-side catalyst layer, on the surface machined with the grooves of the GDL obtained in (Step 1), a platinum oxide was formed by a reactive sputtering process such that a Pt-carrying amount was 0.92 mg/cm$^2$. The reactive sputtering was performed under conditions in which a total pressure was 5 Pa, an oxygen flow rate ($QO_2/(Q_{Ar}+Q_{O2})$) was 70%, and an input power was 4.9 W/cm$^2$.

Successively, a reduction treatment at 120° for 30 minutes was performed for the platinum oxide catalyst in an atmosphere (1 atm) of 2% $H_2$/He. A state where the platinum catalyst layer is carried on the surface of the grooves is illustrated in FIG. 5.

Figure 5:
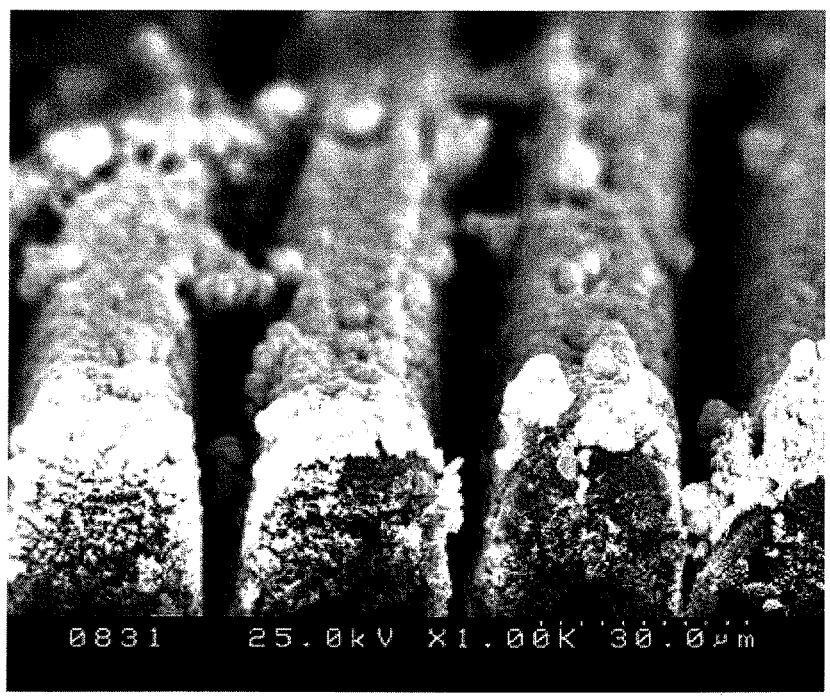
FIG. 5 is a scanning electron micrograph (magnification of 1000 times) illustrating the grooved GDL carrying a platinum catalyst layer according to Example 1 of the present invention.

FIG. 5 is a scanning electron micrograph (magnification of 1000 times) illustrating the grooved GDL carrying a platinum catalyst layer according to Example 1 of the present invention. One looking white in FIG. 5 is the platinum catalyst layer. A thickness of the platinum catalyst layer is about 4.2 μm which is large in ridge portions between the grooves due to a shape effect of the grooves, and is about 2 μm in the grooves, thereby being thin. Further, when bottoms of the grooves were observed, platinum was carried also on groove bottom portions. In this manner, there was obtained a composite of the catalyst layer and the GDL having a structure in which the platinum catalyst layer is carried along recesses and projections formed by the grooves.

After that, an IPA solution in which PTFE and Nafion were mixed and suspended was applied to the catalyst layer, thereby forming the electrolyte channel and performing an appropriate water-repellent treatment on the catalyst surface.

(Step 3)

In order to prepare the anode-side catalyst layer, on the PTFE sheet, the platinum-carrying carbon layer was formed to have a thickness of about 20 μm by the doctor blade method. A catalyst slurry used in this case is a mixture of 1 part by mass of the platinum-carrying carbon (HiSPEC4000 manufactured by Johnson Matthey), 0.07 part by mass of Nafion, 1 part by mass of IPA, and 0.4 part by mass of water. In this case, a Pt-carrying amount was 0.3 mg/cm$^2$.

(Step 4)

Two of the catalyst layers prepared in (Step 2) and (Step 3) were cut out correspondingly to the electrode dimension to sandwich the polymer electrolyte membrane (Nafion112 manufactured by DuPont), and the hot press was performed under press conditions of 8 MPa, 150° C., and 1 min. After that, the PTFE sheet was removed from the platinum-carrying carbon layer, thereby obtaining the grooved MEA of this example.

(Step 5)

The MEA prepared in (Step 4) is sandwiched by arranging the anode-side GDL (LT1200-W), the electrode of the fuel electrode, and the electrode of the air electrode as illustrated in FIG. 1, thereby manufacturing the fuel cell single cell. Here, both electrode plates were provided with slits, thereby allowing a fuel gas to flow therethrough.

Figure 6:
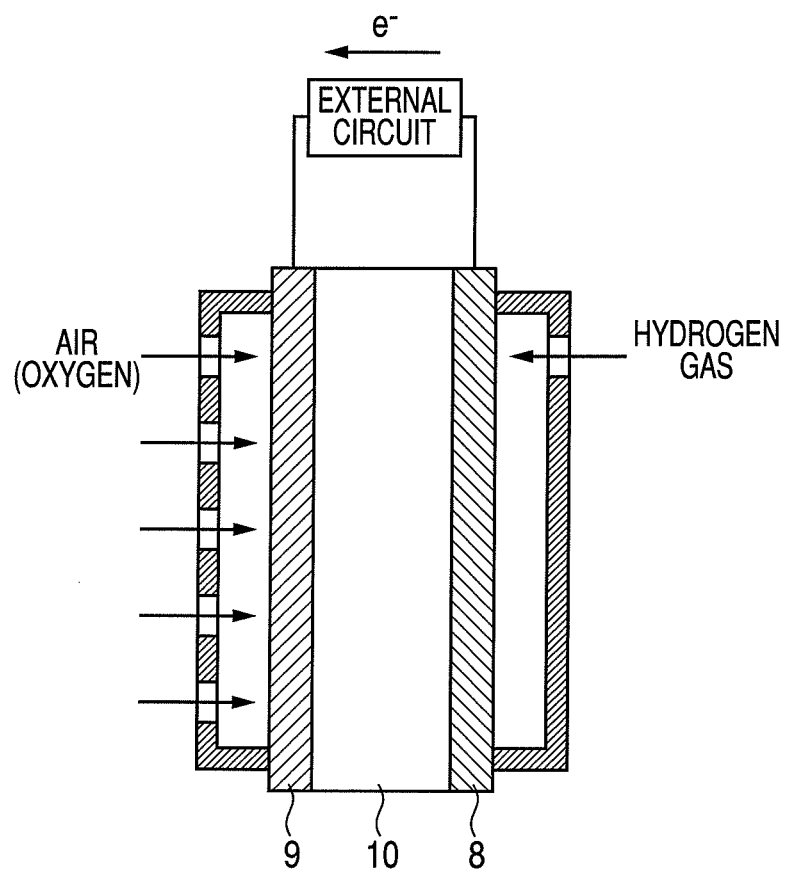
FIG. 6 is a schematic diagram of an evaluation device for a polymer electrolyte fuel cell.

With regard to the single cell prepared by the above-mentioned steps, property evaluation was performed by using an evaluation device structured as illustrated in FIG. 6. In a state where the anode electrode side was filled with a hydrogen gas in a dead end mode and the cathode electrode side was opened to an atmosphere, an electric discharge test was performed at a fuel cell temperature of 80° C. As a result, current-voltage properties as illustrated in FIG. 7 were obtained.

As Comparative Example 1, a single cell was manufactured in the same manner as this example except that, instead of the grooved GDL of (Step 1), the carbon cloth (LT1200-W manufactured by E-TEK) was used, which was not machined with grooves. The current-voltage properties in a case of using the single cell were illustrated in FIG. 7.

Figure 7:
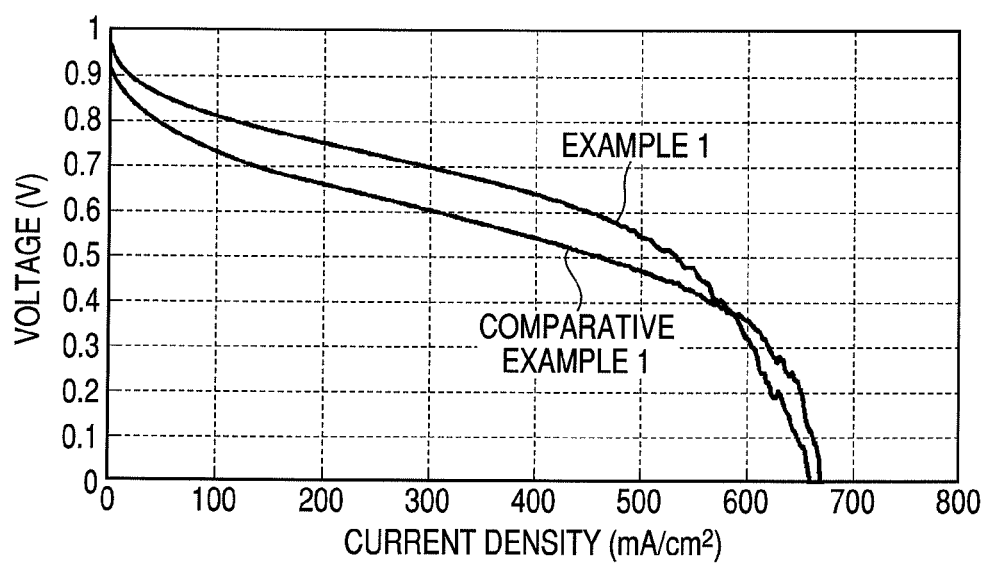
FIG. 7 is a graph illustrating current-voltage properties of polymer electrolyte fuel cells according to Example 1 and Comparative Example 1 of the present invention.

In FIG. 7, first, when comparison was made between current densities at 0.9 V which is in a reaction rate-determining region, the current density in this example was 19.6 mA/cm$^2$ and the current density in Comparative Example 1 was 4.1 mA/cm$^2$. Further, when a further comparison is made between catalyst specific activities obtained by dividing the current densities by the Pt-carrying amount, the catalyst specific activity in this example was 21.3 A/g and the catalyst specific activity in Comparative Example 1 was 4.5 A/g. That is, compared to the MEA of Comparative Example 1, the MEA of this example is greatly suppressed in deterioration of fuel cell properties by catalyst activation polarization. The results show that activation of the catalyst is enhanced because the grooves of the MEA according to this example do not inhibit proton conduction and oxidation-reduction reaction on the catalyst surface and a moisture content in the MEA is diffused more effectively by the grooves, thereby optimally controlling humidity of the electrolyte.

Further, when a comparison was made between voltages at 500 mA/cm$^2$ which was within a diffusion polarization rate-determining region, the single cell of Example 1 could obtain voltage of 0.55 V or larger but the single cell of Comparative Example 1 could only obtain voltage of 0.5 V or less. That is, compared to the MEA of Comparative Example 1, the grooved MEA of this example was greatly suppressed in deterioration of the fuel cell property by the diffusion polarization. This shows that compared to the MEA of Comparative Example 1, the grooved MEA of Example 1 is superior in the drainage performance.

This shows that the grooved MEA layer of this example is superior to the MEA of Comparative Example 1 in the drainage performance and a moisture content distribution state in the MEA surface is autonomously controlled optimally, thereby increasing stability in fuel cell performance and output density at the same time.

EXAMPLE 2

In this example, there is manufactured a polymer electrolyte fuel cell having the structure illustrated in FIG. 1 of the embodiment.

Hereinafter, descriptions will be made only of manufacturing processes of the polymer electrolyte fuel cell according to this example, which are different from those of Example 1 in structure and manufacture.

(Step 1)

A carbon cloth (LT1400-W manufactured by E-TEK) was used as the gas diffusion layer. A surface of the carbon cloth, formed of the carbon fine particles, was irradiated with YAG laser to machine the surface to have the grooved configuration. An output of the laser was 8 W, a beam size thereof was 50 μm, a pulse width thereof was 3 μm/pulse, and a scanning speed thereof was 25 mm/sec. In order to form the groove having a width of 80 μm, the laser was applied twice for the each groove. The first application was performed to form a groove having a width of 50 μm. A second application was performed after shifting an application position by 30 μm in a groove width direction from that of the first application.

The above-mentioned operations were repeated to obtain a GDL having a structure in which grooves each having a width of 80 μm and a depth of 25 μm were arranged on the surface of the carbon fine particle layer at intervals of 900 μm. After that, a gas diffusion layer was cut out correspondingly to an electrode dimension so that all groove end portions were opened on side surfaces of the gas diffusion layer.
(Step 2)

In order to manufacture the cathode-side catalyst layer, on the surface machined with the grooves of the GDL obtained in (Step 1), a platinum oxide was formed by a reactive sputtering process such that a Pt-carrying amount was 0.61 mg/cm². The reactive sputtering was performed under conditions in which a total pressure was 5 Pa, an oxygen flow rate ($QO_2/(Q_{Ar}+Q_{O2})$) was 70%, an input power was 4.9 W/cm².

Successively, a reduction treatment at 120° for 30 minutes was performed for the platinum oxide catalyst in an atmosphere (1 atm) of 2% $H_2$/He. A state where the platinum catalyst layer is carried on the surface of the grooves is illustrated in FIG. 8.

Figure 8:
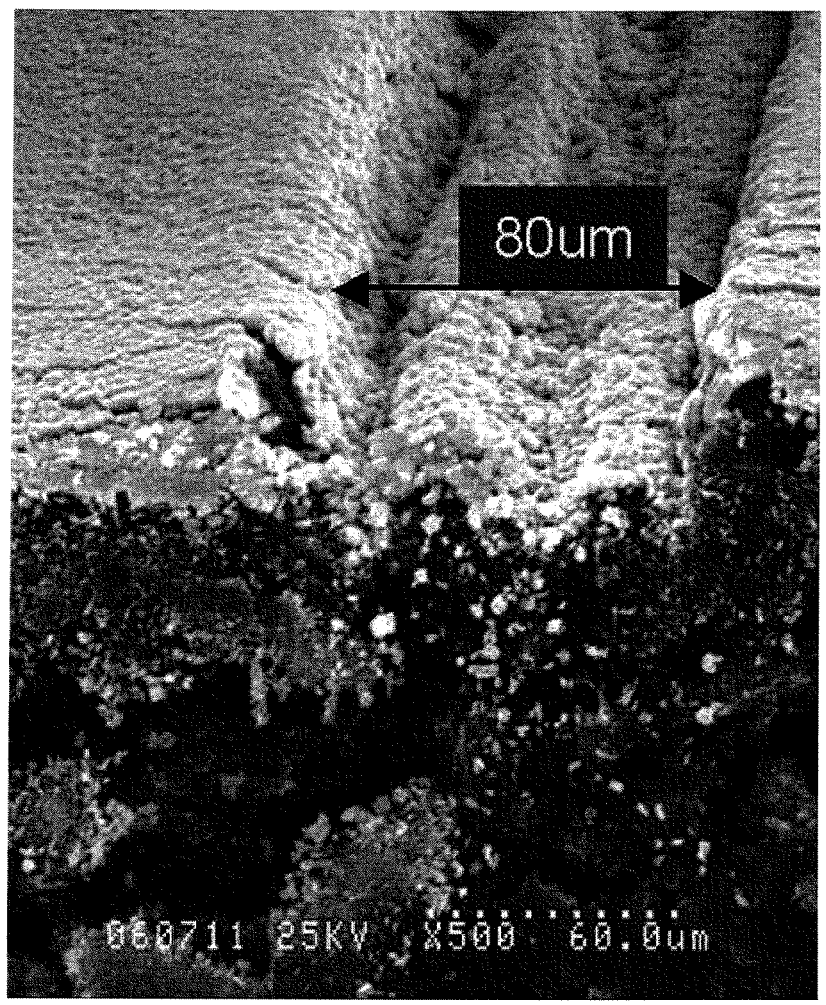
FIG. 8 is a scanning electron micrograph (magnification of 500 times) illustrating a grooved GDL carrying a platinum catalyst layer according to Example 2 of the present invention.

FIG. 8 is a scanning electron micrograph (magnification of 500 times) illustrating the grooved GDL carrying a platinum catalyst layer according to Example 2 of the present invention. One looking white in FIG. 8 is the platinum catalyst layer. In this manner, there was obtained a composite of the catalyst layer and the GDL having a structure in which the platinum catalyst layer is carried along recesses and projections formed by the grooves. The subsequent steps were performed in the same manner as that of Example 1 to form the single cell.

With regard to the single cell prepared by the above-mentioned steps, property evaluation was performed by using an evaluation device structured as illustrated in FIG. 6. In a state where a hydrogen gas is allowed to flow through the anode electrode side and air is allowed to flow through the cathode electrode side, an electric discharge test was performed at a fuel cell temperature of 80° C. As a result, current-voltage properties as illustrated in FIG. 9 were obtained.

As Comparative Example 2, a single cell was manufactured in the same manner as this example except that, instead of the grooved GDL of (Step 1), the carbon cloth (LT1400-W manufactured by E-TEK) was used, which was not machined with grooves. The current-voltage properties in a case of using the single cell were illustrated in FIG. 9.

Figure 9:
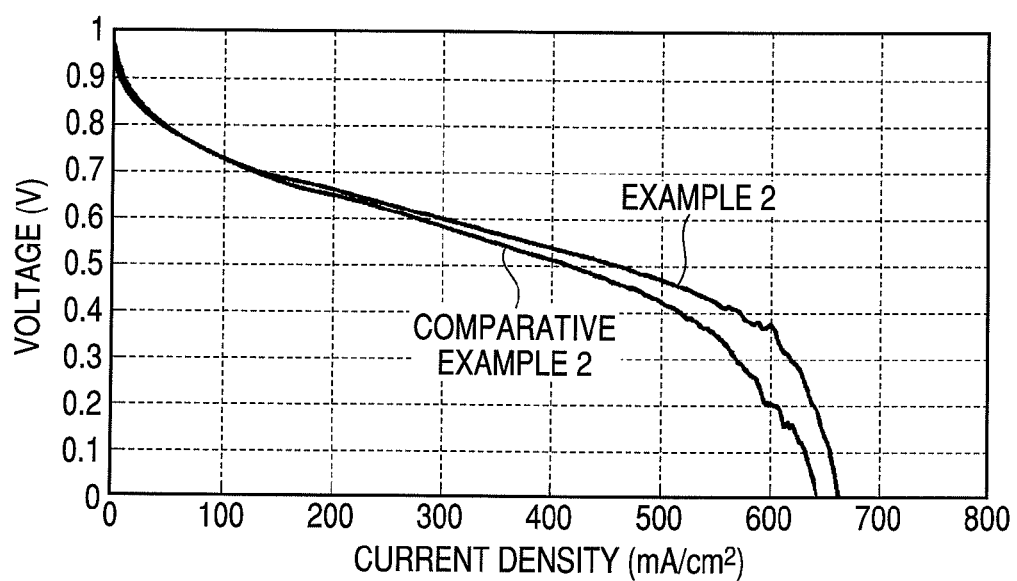
FIG. 9 is a graph illustrating current-voltage properties of polymer electrolyte fuel cells according to Example 2 and Comparative Example 2 of the present invention.

In FIG. 9, first, when comparison was made between current densities at 0.9 V which is in a reaction rate-determining region, the current density in this example was 9.4 mA/cm² and the current density in Comparative Example 2 was 5.4 A/cm². Further, when a further comparison is made between catalyst specific activities obtained by dividing the current densities by the Pt-carrying amount, the catalyst specific activity in this example was 15.4 A/g and the catalyst specific activity in Comparative Example 2 was 8.8 A/g. That is, compared to the MEA of Comparative Example 2, the MEA of this example is greatly suppressed in deterioration of fuel cell properties by catalyst activation polarization. The results show that activation of the catalyst is enhanced because the grooves of the MEA according to this example do not inhibit proton conduction and oxidation-reduction reaction on the catalyst surface and a moisture content in the MEA is diffused more effectively by the grooves, thereby optimally controlling humidity of the electrolyte.

Further, when a comparison was made between voltages at 500 mA/cm² which was within a diffusion polarization rate-determining region, the single cell of Example 2 could obtain voltage of 0.47 V or larger but the single cell of Comparative Example 2 could only obtain voltage of about 0.42 V. That is, compared to the MEA of Comparative Example 2, the grooved MEA of this example was greatly suppressed in deterioration of the fuel cell property by the diffusion polarization. This shows that compared to the MEA of Comparative Example 2, the grooved MEA of Example 2 is superior in the drainage performance.

This shows that the grooved MEA layer of this example is superior to the MEA of Comparative Example 2 in the drainage performance and a moisture content distribution state in the MEA surface is autonomously controlled optimally, thereby increasing stability in fuel cell performance and output density at the same time.

According to the present invention, by providing the grooves for allowing passage or retention of the fluid in the interface between the catalyst layer and the electrolyte membrane, the grooved MEA having improved drainage performance can be provided.

Further, the present invention can provide the polymer electrolyte fuel cell having stable power generation performance by using the grooved MEA. In particular, the present invention is effective in suppressing flooding of the fuel cell using an air breathing method.

The grooved MEA of the present invention is provided with the grooves in the interface between the electrolyte membrane and the catalyst layer, thereby enabling improving the drainage performance thereof from the catalyst layer. Accordingly, the polymer electrolyte fuel cell can be driven at high output level for a long time.

Further, the polymer electrolyte fuel cell including the gas diffusion electrodes of the present invention can be utilized for the fuel cell for small electrical equipment such as a mobile phone, a notebook computer, and a digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage filing of PCT Application No. PCT/JP2007/071163 filed on Oct. 24, 2007 which claims priority of Japanese Patent Applications No. 2006-299470, filed Nov. 2, 2006, all of which hereby incorporated by reference herein in their entirety.

The invention claimed is:

1. A membrane electrode assembly for a polymer electrolyte fuel cell, comprising:
    an electrolyte membrane;
    a catalyst layer;
    a conductive porous gas diffusion layer,
    wherein the catalyst layer and the electrolyte membrane have common boundaries; and
    grooves for allowing one of passage and retention of a fluid being formed in the common boundaries, and
    wherein the grooves have a tapered shape such that a width of each groove is largest at the common boundary, and
    wherein the catalyst layer is disposed between the gas diffusion layer and the electrolyte membrane.

2. The membrane electrode assembly for a polymer electrolyte fuel cell according to claim 1, wherein the grooves for allowing one of passage and retention of the fluid are provided to a surface of the catalyst layer on a side of the electrolyte membrane, and ridge portions between the grooves for allowing one of passage and retention of the fluid are in contact with the electrolyte membrane.

3. The membrane electrode assembly for a polymer electrolyte fuel cell according to claim 1, wherein the grooves are defined by the catalyst layer provided on recessed portions formed on one side of the gas diffusion layer.

4. The membrane electrode assembly for a polymer electrolyte fuel cell according to claim 1, wherein the grooves for allowing one of passage and retention of the fluid each has a width of 3 to 1000 μm.

5. The membrane electrode assembly for a polymer electrolyte fuel cell according to claim 1, wherein the grooves for allowing one of passage and retention of the fluid are provided on the catalyst layer on a cathode side.

6. The membrane electrode assembly for a polymer electrolyte fuel cell according to claim 1, wherein the grooves for allowing one of passage and retention of the fluid are formed in the electrolyte membrane.

* * * * *